US009145263B2

(12) United States Patent
Ellis

(10) Patent No.: US 9,145,263 B2
(45) Date of Patent: Sep. 29, 2015

(54) CONVEYOR BELT TRACKING ROLLER SYSTEM

(71) Applicant: BRELKO PATENTS (PTY) LTD, Johannesburg (ZA)

(72) Inventor: Peter Ellis, Johannesburg (ZA)

(73) Assignee: BRELKO PATENTS (PTY) LTD, Johannesburg (ZA)

( * ) Notice: Subject to any disclaimer, the term of this patent is extended or adjusted under 35 U.S.C. 154(b) by 0 days.

(21) Appl. No.: 14/412,531

(22) PCT Filed: Jul. 3, 2013

(86) PCT No.: PCT/ZA2013/000047
§ 371 (c)(1),
(2) Date: Jan. 2, 2015

(87) PCT Pub. No.: WO2014/008517
PCT Pub. Date: Jan. 9, 2014

(65) Prior Publication Data
US 2015/0183589 A1    Jul. 2, 2015

(30) Foreign Application Priority Data
Jul. 4, 2012   (ZA) .................................. 2012/04980

(51) Int. Cl.
*B65G 39/16*   (2006.01)
*B65G 15/64*   (2006.01)

(52) U.S. Cl.
CPC ................. *B65G 39/16* (2013.01); *B65G 15/64* (2013.01)

(58) Field of Classification Search
CPC ......... B65G 39/12; B65G 39/14; B65G 39/16; B65G 15/64
USPC ..................................................... 198/806, 808
See application file for complete search history.

(56) References Cited

U.S. PATENT DOCUMENTS

| 2,225,276 | A | * | 12/1940 | Parker | 198/806 |
| 2,609,084 | A | * | 9/1952 | Hersey | 198/806 |
| 3,593,841 | A | * | 7/1971 | Leow | 198/806 |
| 4,032,002 | A | * | 6/1977 | Jackson | 198/808 |
| 7,614,493 | B2 | * | 11/2009 | Dowling et al. | 198/806 |
| 7,967,129 | B2 | * | 6/2011 | Swinderman | 198/808 |
| 2013/0284565 | A1 | * | 10/2013 | Kuiper et al. | 198/806 |

FOREIGN PATENT DOCUMENTS

| DE | 10 69 065 B | 11/1959 |
| FR | 2 586 235 A1 | 2/1987 |
| WO | 97/41051 A1 | 11/1997 |

* cited by examiner

*Primary Examiner* — James R Bidwell
(74) *Attorney, Agent, or Firm* — Mattingly & Malur, PC

(57) ABSTRACT

A conveyor belt tracking system in which rollers which support the belt are mounted to a support frame which is pivotally movable about an axis which is centrally positioned relative to the belt and which is inclined to the direction of belt movement.

8 Claims, 4 Drawing Sheets

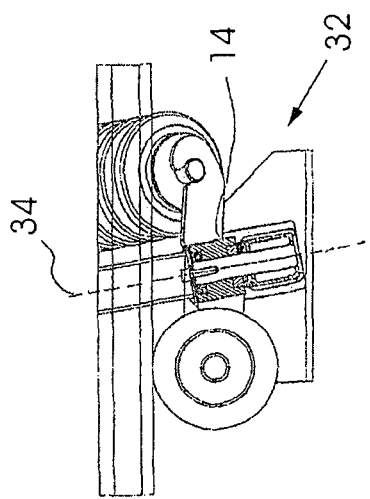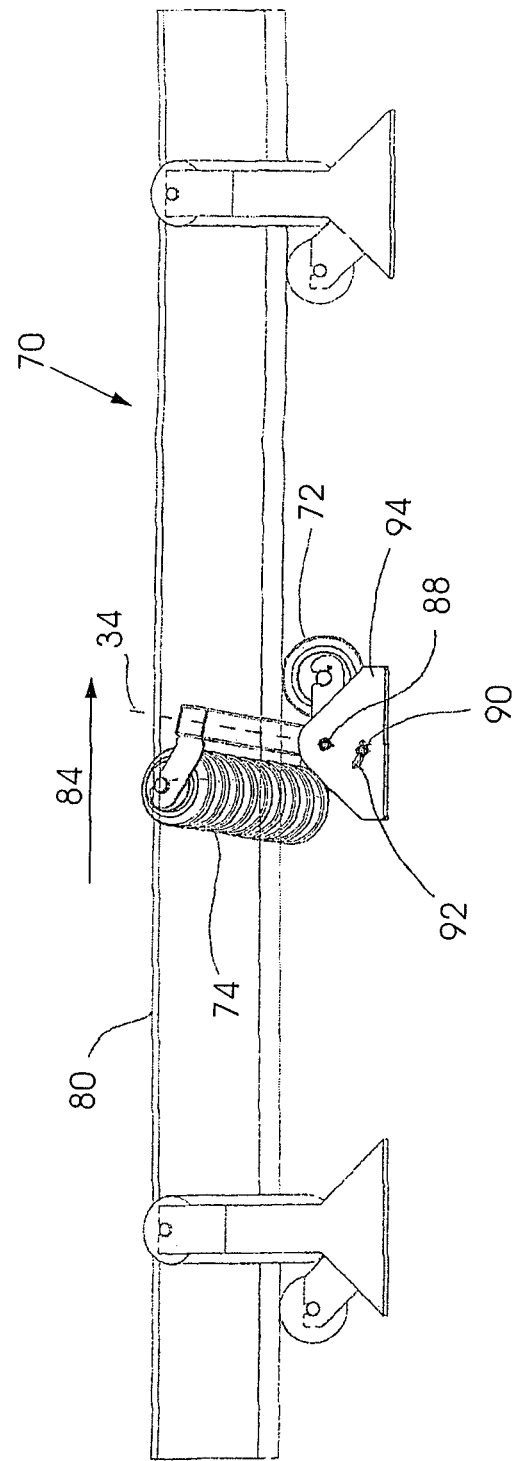

US 9,145,263 B2

CONVEYOR BELT TRACKING ROLLER SYSTEM

FIELD OF THE INVENTION

This invention relates to a tracking system for a conveyor belt.

BACKGROUND OF THE INVENTION

Misalignment or mistracking of a conveyor belt can have various adverse consequences including belt downtime, and damage to mechanical components and to the belt.

There are many factors which can cause conveyor belt misalignment. For example, misalignment can be produced by a tail roller or idler frames which are not perpendicular to the direction of belt movement. A change of length in the belt due to a bad splice, incorrect loading and so on can also cause mistracking. Other causes of belt misalignment include scrapers or skirtings which are incorrectly adjusted, material build-up on idlers, damaged lagging on rollers, and so on.

The applicant is aware of a number of techniques which have been proposed to correct belt misalignment, substantially in an automatic manner.

One proposal makes use of a central pin which is inclined at 45° to the vertical. The pin supports a belt carriage to which horizontally-orientated rollers are mounted. If the belt drifts to one side then a roller, on that side, tilts downwardly and, due to the inclination of the pin, also moves in a horizontal sense. The conveyor belt then automatically tends to move to a higher roller and a self-correcting action takes place.

In a different approach, a roller with tapered ends, of reducing size, is mounted to a central pin for limited rotational movement in a horizontal plane. Movement of the belt to one side causes the belt to contact the tapered surface on that side of the roller. This action accelerates the tapered surface which is then moved in the same direction as the direction of belt movement. The belt then tends to revert to a central position with a correcting action.

Another solution is proposed in a so-called bidirectional belt trainer which makes use of a ball joint to which a roller carriage is mounted for pivotal movement in a horizontal plane. Tracking of a belt to one side causes a corresponding movement of the roller carriage and corrective action which is generated through the medium of an intermediate control device helps to restore the belt to a desired position.

Another solution requires a carriage to be mounted to a centrally positioned pivot point. Rollers supported by the carriage are movable in unison with the carriage to correct belt misalignment.

Each of the aforementioned techniques, in the applicant's opinion, functions at least to some extent in a satisfactory manner. However, some of the systems are difficult to install or expensive to fabricate. There is also a need for a system which can be adjusted on site to suit particular installation conditions.

SUMMARY OF THE INVENTION

An object of the present invention is to provide a tracking system, to address belt misalignment, which is of robust construction and easy to install and which offers a capability for adjustment on site to meet particular operating conditions.

The present invention provides a conveyor belt tracking roller system. The system of the present invention includes a carriage, a support frame, a connection arrangement which connects the support frame to the carriage whereby the support frame is pivotally movable relative to the carriage about a primary axis, at least two belt supporting rollers mounted to the support frame, each roller being rotatable about a respective axis which is inclined to the horizontal, mounting structure which is engaged with the carriage, and an adjustment mechanism which is operable to adjust the orientation of the primary axis relative to the mounting structure.

The tracking roller system of the present invention can take on different forms. In one embodiment of the invention, the system includes at least two rollers which extend outwardly and upwardly from the primary axis. The mounting structure may then comprise first and second components which are engaged with respective opposing ends of the carriage which may underlie the support frame. The carriage may be pivotally movable relative to the first and second components, at least to a limited extent, and may be locked, at a desired inclination relative to the components, in any appropriate way.

In another form of the present invention, the roller system includes at least one centrally positioned roller which extends horizontally and at least second and third rollers which flank the central roller and which extend upwardly. The mounting structure may, again, include first and second components, respectively engaged with opposing ends of the carriage and constructed so that limited pivotal movement of the carriage relative to the mounting structure is possible. Locking means may be provided to position the carriage so that the primary axis is at a desired orientation relative to the mounting structure.

Various roller configurations are possible. Typically, on a return run, use is made of two rollers, but this is exemplary only. On a forward run, i.e. in the load-carrying, the belt may be supported by a single central roller with two wing rollers, or by a single central roller with two wing rollers on one side of the central roller and two wing rollers on an opposed side of the central roller. If necessary, two central rollers may replace one single central roller.

The orientation of the primary axis may be adjustable from vertical, through an angle of up to 30°, in a direction which is parallel to the direction of belt movement. Preferably the orientation is in the range of 10° to 15°.

Depending on the embodiment the primary axis may be inclined in, or onto, the direction of belt movement.

BRIEF DESCRIPTION OF THE DRAWINGS

The invention is further described by way of examples with reference to the accompanying drawings in which:

FIG. 5 is a view in cross-section of the system taken on a line marked 5-5 in FIG. 4; and FIG. 6 illustrates from one side the tracking system of FIG. 4 installed and supporting a belt.

DESCRIPTION OF PREFERRED EMBODIMENTS

Figure 1:
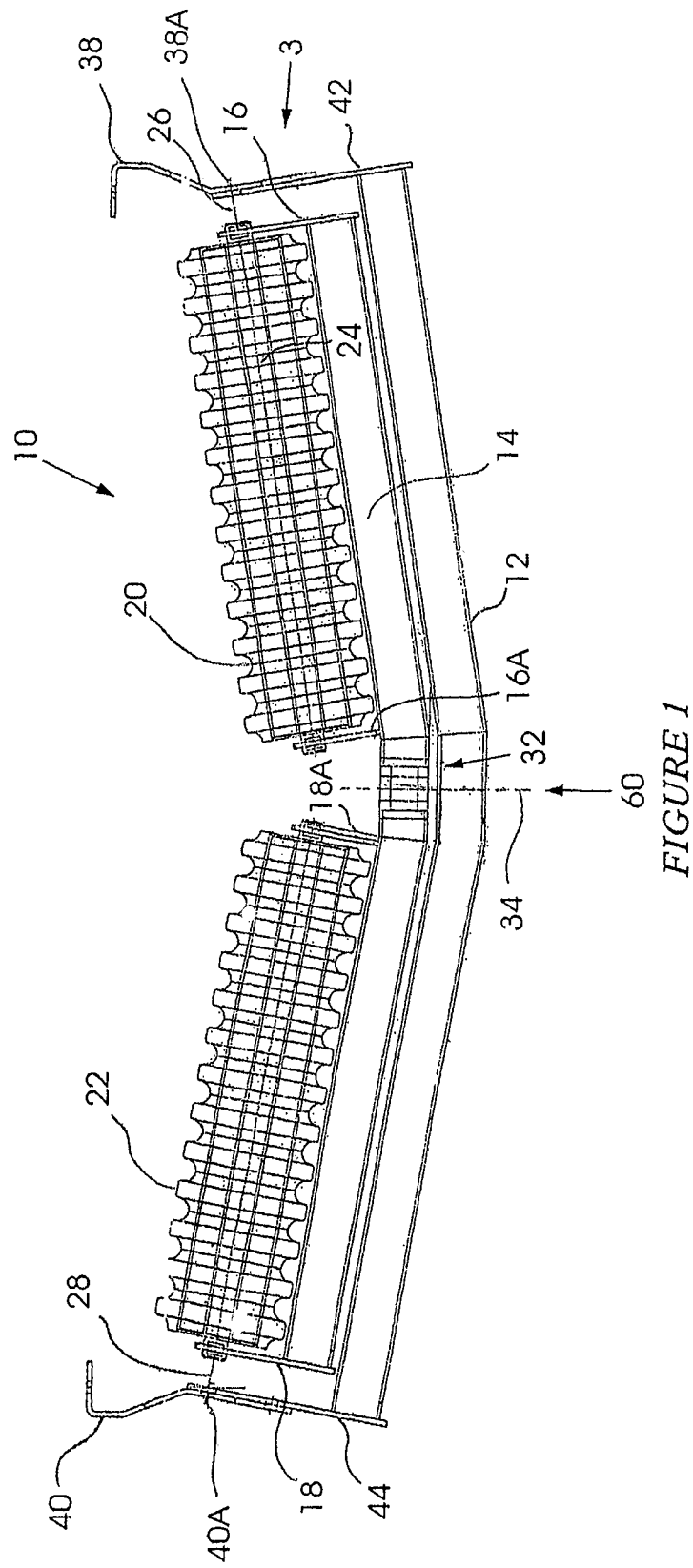
FIG. 1 is a view in elevation of a tracking roller system, according to one form of the invention, which is suited for use particularly on a return run of a conveyor belt.
Figure 2:
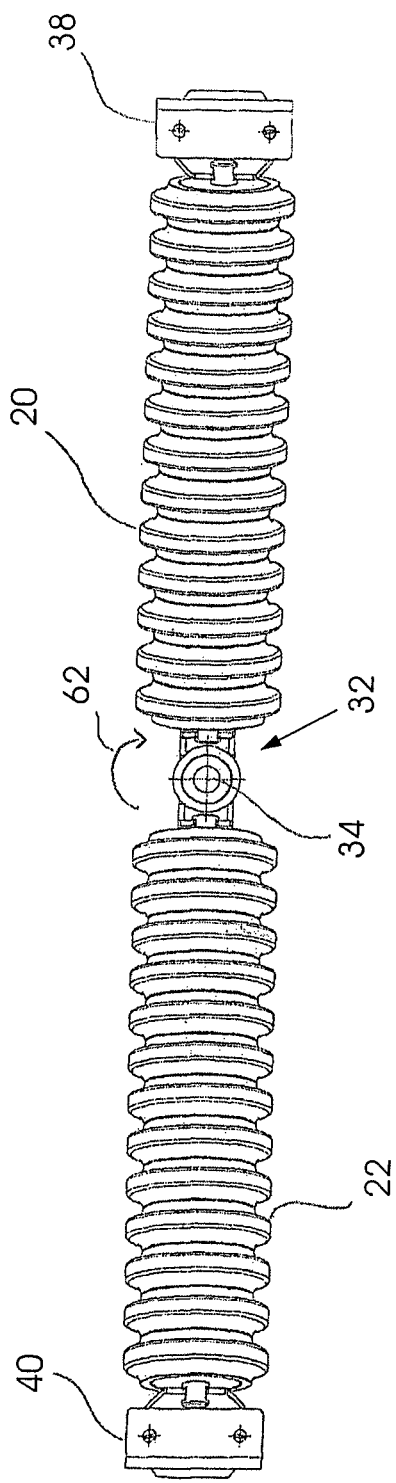
FIG. 2 is a plan view of the system shown in FIG. 1.
Figure 3:
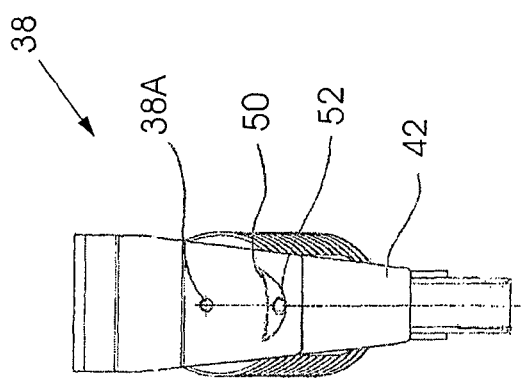
FIG. 3 is an end view of the tracking system taken in a direction of an arrow marked 3 in FIG. 1.

FIGS. 1, 2 and 3 are different views of a conveyor belt tracking roller system 10, according to a first form of the invention, which is suitable for use, particularly, on a return run of a conveyor belt i.e. on that portion of the belt which does not carry a load.

The system includes a carriage 12, a support frame 14, and opposed uprights 16 and 18 at opposite ends of the support frame and intermediate uprights 16A and 18A respectively, to which tracking rollers 20 and 22 respectively are mounted.

The first tracking roller 20 is supported on a shaft 24 which extends between the uprights 16 and 16A. The shaft lies on a longitudinal axis 26 which is inclined to the horizontal. The second tracking roller 22 is similarly mounted and is rotatable about an inclined longitudinal axis 28.

In this case, the arrangement is one in which, although the axes 26 and 28 are inclined to the horizontal when viewed in plan, the axes are substantially in line with each other.

A connection arrangement 32 is used to couple the support frame to the carriage. The connection arrangement defines a centrally located primary axis 34 about which the support frame 14 is pivotally movable, to and fro, to a limited extent relative to the carriage 12. In plan the location of the axis 34 is substantially in line with the axes 26 and 28—see FIG. 2.

Mounting structures 38 and 40, in the form of shaped plates, are fixed to opposed ends of the carriage. This is done through the medium of respective bolts 38A and 40A which are pivotally connected to secondary plates 42 and 44, respectively which are fixed to opposing ends of the carriage.

Referring to FIG. 3 the carriage 12 is pivotally movable, to a limited extent, relative to the mounting structure 38, about an axis formed by the bolt 38A. An arcuate slot 50 is formed in a lower part of the mounting structure 38 and is centered on a hole 52 in the secondary plate 42. This adjustment mechanism allows the carriage 12 to be pivoted relative to the mounting structure i.e. about the bolts 38A and 40A respectively. In so doing, the orientation of the primary axis 34 relative to the mounting structure can be adjusted. Respective bolts (not shown) are engaged with the holes 52 and can be tightened, when required, to fix the carriage 12 in a desired orientation relative to the support frame 14.

The tracking system 10 is installed at a desired location on a conveyor belt structure, not shown. Typically, the installation location is identified as one at which misalignment of the conveyor belt can occur due to any one of a variety of reasons. The cause of misalignment is not important to an understanding of the invention.

The rollers 20 and 22 are tracking rollers and the conveyor belt (not shown) rests on upper surfaces of the rollers. The belt moves in a direction 60. The rollers are grooved to enhance traction and are lagged with rubber, polyurethane or an appropriate plastic material to enhance frictional effects. These aspects are important because the self-alignment qualities of the tracking system depend on effective frictional engagement of the tracking rollers with an underside of the conveyor belt.

The adjustment mechanism is set so that the primary axis 34 tilts forwardly in the direction of belt movement. The degree of tilt can be adjusted on site as may be required to ensure optimum operation of the tracking system. If the degree of tilt is zero then the rollers in the support frame 14 pivot about a vertical axis in a horizontal mode. If the degree of tilt is increased from zero then, when pivotal movement of the support frame takes place, one roller will tend to move downwardly while the other moves upwardly. The degree of movement in the vertical sense is directly related to the angle of tilt.

Assume that a belt on the rollers drifts to the left. The belt starts climbing the roller 22. This movement transfers increased weight to the roller 22 and so causes the rollers and the support frame 14 to pivot about the primary axis 34 in a clockwise direction 62 (viewed in plan)—see FIG. 2. The roller 20 is elevated while the roller 22 drops. The change in height, in each case, is determined by the extent of the pivotal movement and the angle of tilt of the primary axis 34. As the roller 20 is elevated, the frictional engagement between the roller 20 and the belt increases and the belt then tends to travel up the roller 20 i.e. to move to the right, to a centralised and correct position. The misalignment is therefore corrected automatically.

The alignment action of the system is dependent, inter alia, on the inclination of the primary axis 34 which, as noted, is between the axes of the two rollers, viewed in plan. The inclination of the primary axis normally lies in the range 10° to 15°. However, depending on the application, the angle of inclination can be substantially higher, up to 30°. Optimum functioning of the tracking roller system can be achieved by adjusting the angle of inclination during operation. As a general rule though, satisfactory operation is achieved when the angle of inclination lies in the range 10° to 15°. These values are exemplary only and are not restrictive for, as noted, operational factors can have an influence on optimum functioning of the tracking system.

It is possible to position the primary axis 34 so that it is not aligned with the axes 26 and 28 but is offset either in what is a forward direction of belt movement or in an opposing direction. However, to position the axis in this way, a more complex form of construction is required.

Figure 4:
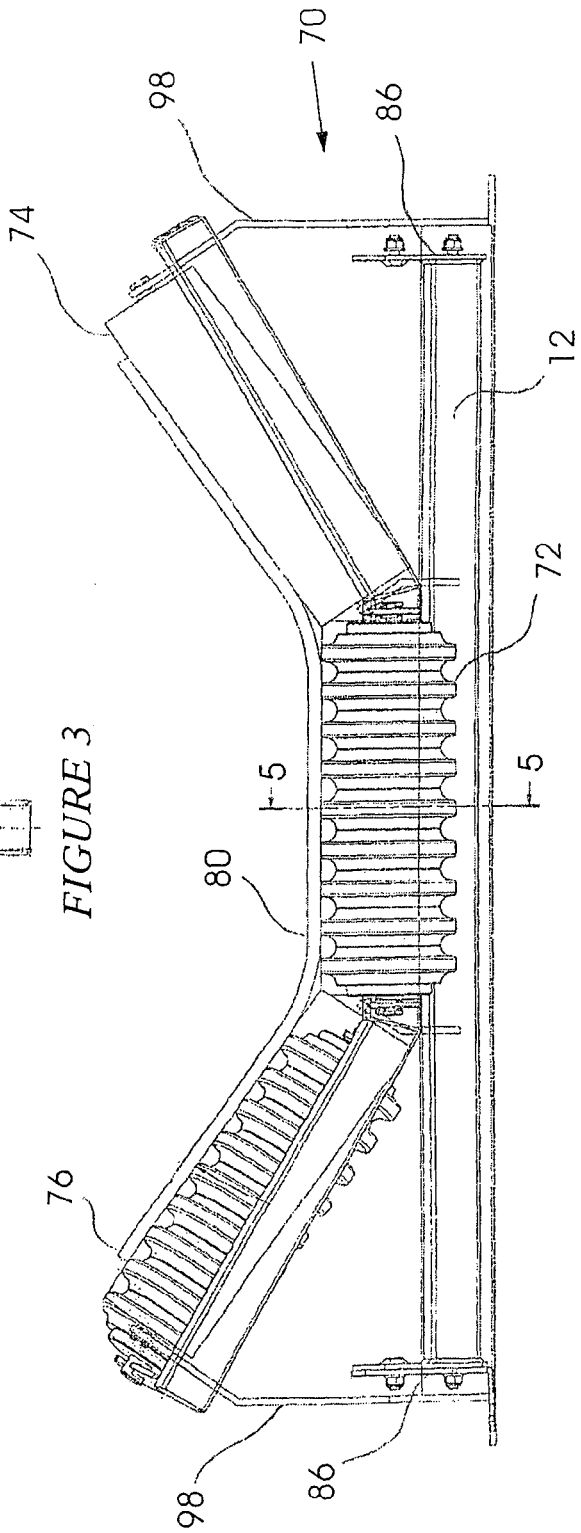
FIG. 4 is a view in elevation of a tracking system, according to a second form of the invention, which includes three rollers and which is suited for use, particularly, on a forward or load-carrying run of a conveyor belt.

FIGS. 4, 5 and 6 show a conveyor belt tracking roller system 70, according to a second form of the invention, which is suited particularly for use in a forward run of a conveyor belt i.e. together with that portion of the belt which carries a load. The system 70 includes a centrally positioned roller 72 which is flanked by outwardly and upwardly extending side rollers 74 and 76. FIG. 4 illustrates a conveyor belt 80 resting on upper surfaces of the rollers.

FIG. 5 shows a connection arrangement 32 which in general terms is the same as that employed in the system 10 whereby a support frame 14 is mounted to an underlying carriage 12 in such a way that it is pivotally movable, to and fro, relative to the carriage about a primary axis 34. Viewed in plan, see FIG. 5, the primary axis 34 is positioned between the central roller 72 and the wing or side rollers 74 and 76. With experimentation it has been found that in general terms, this type of configuration give satisfactory performance. However it is possible to have a configuration in which the wing rollers 74 and 76 are in line with the central roller 72. It is also possible, although at the expense of a more complex construction, to have a configuration in which the primary axis 34 is below a central point on the central roller.

FIG. 6 is a side view of the system 70 in an installed configuration, but from an opposing side compared to the side shown in FIG. 5. A forward run of the belt 80 is movable in a direction 84. The primary axis 34 is forwardly inclined i.e. it tilts in the direction 84. The range of tilt is similar to that for the first embodiment 10, namely, the axis 34 can be tilted through an angle of up to 30° relative to the vertical but typically the degree of tilt would be in the range of 10° to 15°.

Mounting structures 86 are attached to opposed ends of the carriage 12. Each mounting structure 86 includes a set of bolts 88, 90 which function in the same way as the arrangement shown in FIG. 3 in that an arcuate slot 92 formed in a plate 94 is centered on the bolt 90. The bolt 88 provides a pivot point about which the primary axis is pivotal to and fro. Uprights 98 support opposed ends of the shafts on which the rollers 74 and 76 are mounted, in a pivotal manner.

The central roller 72, in an installed configuration, is, as depicted in FIG. 6, forwardly positioned relative to the outer rollers 74 and 76, taken in the direction 84 of belt travel.

If the belt 80 tracks to one side then it climbs up a corresponding roller. Increased weight is transferred to that roller. The roller then tends to move downwardly. The central roller 72 moves generally in a horizontal mode only. Corrective forces are exerted on the belt 80 which restore the belt to a central position. Fine adjustment of the orientation of the primary axis 34 can take place on site by adjusting the bolts 90 to ensure optimum operation.

Effective operation can also be achieved if the primary axis 34 is inclined in a direction opposite to the direction 84 i.e. into or against the direction of belt movement. If the belt 80 tracks to one side then, again, it tends to move upwardly on the respective roller which then moves slightly together with the belt, causing the whole tracking system to rotate as well. The central roller 72 is constrained to move substantially in a horizontal mode. The resultant of the forces, which are generated, when the belt is off-centre, is such that corrective action is applied to the belt, which brings it back into line.

It is believed that the positioning of the primary axis between the central roller and the two offset wing rollers (when viewed in plan) allows the tracking system of the invention to function effectively if the inclination of the primary axis is in the direction of belt movement, or into the direction of belt movement. By way of contrast, referring to the first embodiment in FIGS. 1, 2 and 3, the primary axis is centrally disposed and is aligned with the axes of the two rollers 20 and 22. In this first embodiment, satisfactory operation is achieved when the primary axis 34 is tilted forwardly in the direction of belt movement. The corrective action, which is achieved if the primary axis is tilted into the direction of belt movement is less effective.

The invention claimed is:

1. A conveyor belt tracking roller system which includes a carriage, a support frame, a connection arrangement which connects the support frame to the carriage whereby the support frame is pivotally movable relative to the carriage about a primary axis, at least first and second belt supporting rollers which are mounted to the support frame and which extend outwardly and upwardly from the primary axis, each roller being rotatable about a respective axis which is inclined to the horizontal, mounting structure which is engaged with the carriage and which includes first and second components which are engaged with respective opposing ends of the carriage, and an adjustment mechanism which is operable to adjust the orientation of the primary axis relative to the mounting structure, wherein the carriage is pivotally movable relative to the first and second components to a limited extent, and the adjustment mechanism includes an arcuate slot which is centered on a fastener which is used to fix the carriage in a desired orientation relative to the support frame.

2. A system according to claim 1, wherein the orientation of the primary axis is adjustable by an angle of up to 30° from the vertical in a direction which is parallel to the direction of belt movement.

3. A system according to claim 2, wherein the orientation of the primary axis relative to the vertical is in the range of from 10° to 15°.

4. A system according to claim 1, wherein the orientation of the primary axis is in a direction which is the same as the direction of belt movement.

5. A system according to claim 1, wherein the primary axis is located between the respective axes of the at least first and second rollers, viewed in plan.

6. A system according to claim 1, which includes at least one centrally positioned roller which extends horizontally and the at least first and second rollers respectively flank the central roller.

7. A system according to claim 1, which includes locking means to position the carriage so that the primary axis is at a desired orientation relative to the mounting structure.

8. A system according to claim 6 wherein, viewed in plan, the primary axis is positioned between the at least one centrally positioned roller and the at least first and second rollers.

* * * * *